(12) United States Patent
Balensiefer, II et al.

(10) Patent No.: US 8,991,935 B2
(45) Date of Patent: Mar. 31, 2015

(54) CHILD SAFETY SEAT WITH SHOCK ABSORBER HAVING COMPRESSION-TYPE SOFT MATERIAL RESILIENT MEMBER

(71) Applicant: Inspired Products Group, LLC, Studio City, CA (US)

(72) Inventors: Eugene R. Balensiefer, II, Tipton, IN (US); James W. Holley, Jr., Colorado Springs, CO (US)

(73) Assignee: Inspired Products Group, LLC, Studio City, CA (US)

( * ) Notice: Subject to any disclaimer, the term of this patent is extended or adjusted under 35 U.S.C. 154(b) by 88 days.

(21) Appl. No.: 13/794,643

(22) Filed: Mar. 11, 2013

(65) Prior Publication Data

US 2014/0252841 A1 Sep. 11, 2014

(51) Int. Cl.
| B60R 22/00 | (2006.01) |
| B60N 2/42 | (2006.01) |
| B60N 2/26 | (2006.01) |
| B60N 2/28 | (2006.01) |

(52) U.S. Cl.
CPC ............... *B60N 2/26* (2013.01); *B60N 2/2803* (2013.01)
USPC ...................... 297/471; 297/216.11; 297/470

(58) Field of Classification Search
CPC .. B60N 2/2803; B60N 2/2809; B60N 2/2812; B60R 22/105; B60R 22/16; B60R 2022/006
USPC ........................... 297/216.11, 250.1, 470, 471
See application file for complete search history.

(56) References Cited

U.S. PATENT DOCUMENTS

| 3,910,634 | A | 10/1975 | Morris |
| 4,201,418 | A * | 5/1980 | Reidelbach et al. .......... 297/474 |
| 5,294,183 | A | 3/1994 | Wetter et al. |
| 6,796,610 | B2 * | 9/2004 | Nakagawa et al. ...... 297/256.16 |
| 7,083,237 | B2 | 8/2006 | Horton et al. |
| 7,390,064 | B2 | 6/2008 | Horton et al. |
| 7,467,824 | B2 | 12/2008 | Nakhla et al. |
| 7,644,986 | B2 | 1/2010 | Berger et al. |
| 7,648,199 | B2 | 1/2010 | Amesar et al. |
| 7,735,919 | B2 | 6/2010 | Chen et al. |
| 8,496,293 | B2 | 7/2013 | Gaudreau |
| 2003/0159258 | A1 | 8/2003 | Wetter |
| 2007/0210639 | A1 * | 9/2007 | Berger et al. ................. 297/470 |
| 2010/0052402 | A1 * | 3/2010 | Berger et al. ................. 297/471 |
| 2010/0109217 | A1 * | 5/2010 | Ruthinowski et al. ... 267/140.13 |
| 2010/0293759 | A1 * | 11/2010 | Wada ........................ 24/265 EC |
| 2011/0227383 | A1 * | 9/2011 | Strong ....................... 297/250.1 |
| 2012/0001460 | A1 | 1/2012 | Ruthinowski et al. |

* cited by examiner

*Primary Examiner* — Philip Gabler
(74) *Attorney, Agent, or Firm* — Bever, Hoffman & Harms, LLP (57) ABSTRACT

A child safety seat utilizes a compression-type resilient shock absorber in which a soft-material resilient member serves to dampen shocks applied to the seat's harness assembly by undergoing compressive deformation in a way that prevents the harness safety belts from experiencing a "hard stop". The resilient member (e.g., a foam rubber block, a gel-like substance, or a fluid-filled bladder) is disposed such that one portion is held against a rigid support (e.g., the backside surface of the seat's shell), and a second portion is operably coupled to a fixed end of a safety belt. The resilient shock absorber is oriented such that tension applied to the safety belt pulls the two end portions of the resilient member toward each other and against the rigid support, thereby causing the resilient member to compressively deform against the rigid support.

17 Claims, 6 Drawing Sheets

CHILD SAFETY SEAT WITH SHOCK ABSORBER HAVING COMPRESSION-TYPE SOFT MATERIAL RESILIENT MEMBER

FIELD OF THE INVENTION

The present invention relates generally to child safety and restraint devices. More specifically, the present invention relates to child safety seats and associated harness systems.

BACKGROUND OF THE INVENTION

Child safety seats (sometimes referred to as an infant safety seat, a child restraint system, a restraint car seat, or ambiguously as car seats) are seats designed specifically to protect children from injury or death during collisions. These seats are typically purchased and installed by consumers. Many regions require children defined by age, weight, and/or height to use a specific government-approved child safety seat, resulting is several classes of child safety seats generally referred to as baby (or infant) car seats for children up to 2 years or older, and "booster seats" for children to age 9 or 90 lbs.

All child safety seats must pass rigorous compliance testing before sale to consumers is authorized, for example, by the National Highway Traffic Safety Administration. One area of compliance testing involves measuring chest acceleration, and is measured by strapping a test dummy into a proposed child safety seat product, and then simulating a frontal crash at a regulated speed (e.g., 35 miles per hour). If the test dummy experiences predetermined minimum resultant chest acceleration (e.g., 60 G's or more), then the proposed child safety seat product fails testing and is not authorized for sale to the public.

Conventional methods for achieving chest acceleration compliance include the addition of shock absorbing pads to the restraint harness (safety belt) located over the chest region of the test dummy. While this approach is mechanically workable (i.e., compliance may be achievable by adding sufficient chest padding to the safety harness), it is commercially impractical for several reasons. First, because such chest padding must be manipulated by a consumer every time a child is seated into or removed from the safety seat, a significant amount of chest padding in the safety harness can substantially detract from the marketability of a child safety seat. That is, consumers are more likely to purchase a child safety seat that utilizes a harness formed with standard safety belts over a seat having a bulky padded restraint harness that is difficult to install and remove. In addition, padded restraint harnesses acts as an insulator that can cause a child to overheat, which can also detract from the marketability of a child safety seat. Moreover, because chest restraint harnesses are prominently located in in the center-front region of every child safety seat and are constantly subjected to passenger contact, the addition of bulky padding requires the use of cover materials that have a soft feel, are durable, and are attractively decorated or otherwise aesthetically pleasing, all of which significantly increase the cost of a child safety seat.

Other attempted methods for achieving chest acceleration compliance include utilizing energy-absorbing regions into the construction of the harness itself thereby permitting release or extension of the harness during a crash to absorb shocks. While these systems avoid the need for chest padding, they utilize tension-type shock absorbing elements that either provide a potentially unlimited amount of stretch, or they require a rigid member or additional strap to set an upper limit on the amount of permitted stretch. When the amount of stretch is unlimited, such tension-type shock absorbing elements permit an active child to displace the harness belts and/or partially escape the restraint harness system, thus subjecting the child to injury during a crash. In addition, unlimited tension-type resilient elements are problematic because they become weaker under stain (i.e., they become thinner when stretched), making it difficult to add flexibility without risking breakage. When a limit device is used, the limit device sets a "hard stop" at the end of the belt play that can generate a sharp increase in deceleration, causing a safety seat to fail crash testing.

What is needed is a mechanism for achieving chest acceleration compliance that avoids the problems associated with conventional methods. Specifically, what is needed is a child safety seat that is economical to produce, easy to use, and reliably meets government chest acceleration compliance testing.

SUMMARY OF THE INVENTION

The present invention is directed to a child safety seat that utilizes a resilient shock absorber that utilizes a soft material resilient member to dampen and absorb substantially all of the shock energy applied to the seat's harness (safety belt) assembly by undergoing compressive deformation in a way that prevents the harness safety belts from experiencing a "hard stop". The soft material resilient member is a three-dimensional object (e.g., a block of a foam rubber, a membrane containing a gel-like substance, or a fluid-filled bladder) disposed between rigid support (e.g., the backside surface of the seat's shell) and a fixed end of an associated safety belt. The resilient shock absorber is oriented such that tension applied to the safety belts pulls two end portions of the resilient member toward each other, thereby causing the resilient member to compressively deform against the rigid support. In an emergency, this compressive deformation is utilized to convert shock energy (i.e., tensile force transmitted along the safety belts) to potential energy that is stored in the resilient member, which is released after a crash event to reset the safety belts to their original length. The present invention thus provides several advantages over conventional approaches. First, because the end of the safety belt is only permitted to move in accordance with deformation of the soft-material resilient member, and because movement of the soft material resilient member is precluded by the rigid support, the maximum amount of play in the safety belt is limited by the thickness of the soft-material resilient member. Therefore, by setting the thickness of the resilient member such that it does not permit a child from displacing the safety belts enough to escape, the present invention avoids the problems associated with tension-type shock absorbing elements having unlimited stretch. In addition, because the soft-material resilient member is the only element that absorbs the crash energy (i.e., no tether or other range-limiting mechanism is used), the present invention avoids the "hard stop" problems associated with range limited tension-type shock absorbing devices.

The present inventors also determined found through experimentation and actual crash testing that, by retrofitting a standard child safety seat with the resilient shock absorbers described herein, the child safety seat exhibits a greatly improved ability to meet government chest acceleration compliance standards than can be achieved by the addition of harness-mounted chest padding. In addition to providing this significant safety improvement, because the shock absorber is disposed at the fixed ends of the safety belts, it can be disposed either under a seat cover or on a backside surface of the seat, thereby allowing the use of standard safety belts to secure a child in the seating area that are relatively easy to manipulate (i.e., in comparison to belts encumbered by chest padding) and maximize the child's comfort (e.g., minimize the chances of overheating). Further, because the fixed end of the belts are typically disposed outside of the visible seating area, the resilient material block shock absorber (and its associated belt attaching mechanism) can be produced without concern for texture or aesthetic appeal because it can be "hidden" on the backside of the safety seat shell (or under the seat cover fabric on the front side of the safety seat shell), thereby significantly reducing manufacturing costs over solutions that are continuously contacted by the child/passenger or are otherwise displayed in the passenger seating region.

According to alternative embodiments, the resilient shock absorber is attached to the seat shell in various ways, and is implemented using any of several different types of actuation mechanisms. In alternative embodiments, the resilient shock absorber utilizes various types of three-dimensional soft-material resilient members (e.g., membrane-encased elastic gels, fluid-filled bladders, or blocks of an elastic/resilient material). In various embodiments, rigid back plates are used to uniformly compress the resilient member in order to maximize shock absorption. In some embodiments the resilient shock absorber is attached to the frontside surface of the seat shell and hidden under a flexible seat cover, and in other embodiments the resilient shock absorber is disposed in the seat's backside region (i.e., with the safety belt extending through a slot defined in the seat shell). Various optional housings or flanges are utilized to contain the resilient member, and to further restrict lateral deformation of the resilient member. Each of these different embodiments may be implemented to produce child safety seats exhibiting both the enhanced safety and low production costs associated with the main aspects of the present invention.

According to a presently preferred embodiment, the resilient shock absorber includes a foam rubber block mounted in a containment area on the backside seat region, and the safety belt extends through a slit defined through the foam rubber block and is secured to a rigid plate that applies a substantially uniform pressure on the foam block during a crash. The use of a foam rubber block actuated by a rigid plate provides superior and reliable resilient shock absorbing functionality at a minimal cost, and has been successfully proven to meet and exceed government chest acceleration compliance standards. By providing a loop (web) on the fixed end portion of the safety belt, and by implementing the rigid plate using a three-bar belt slide with a central bar extending through the loop, assembly of the resilient shock absorber is greatly simplified. Assembly is further simplified by forming integrally molded flanges on the backside surface of the seat shell that form the containment area in which the foam rubber block is mounted.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in child safety seats. The following description is presented to enable one of ordinary skill in the art to make and use the invention as provided in the context of a particular application and its requirements. As used herein, directional terms such as "upper", "upward", "lower", "downward", "front", "frontside", "back", "backside", are intended to provide relative positions for purposes of description, and are not intended to designate an absolute frame of reference. In addition, the phrases "integrally connected" and "integrally molded" is used herein to describe the connective relationship between two portions of a single molded or machined structure, and are distinguished from the terms "connected" or "coupled" (without the modifier "integrally"), which indicates two separate structures that are joined by way of, for example, adhesive, fastener, clip, or movable joint. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
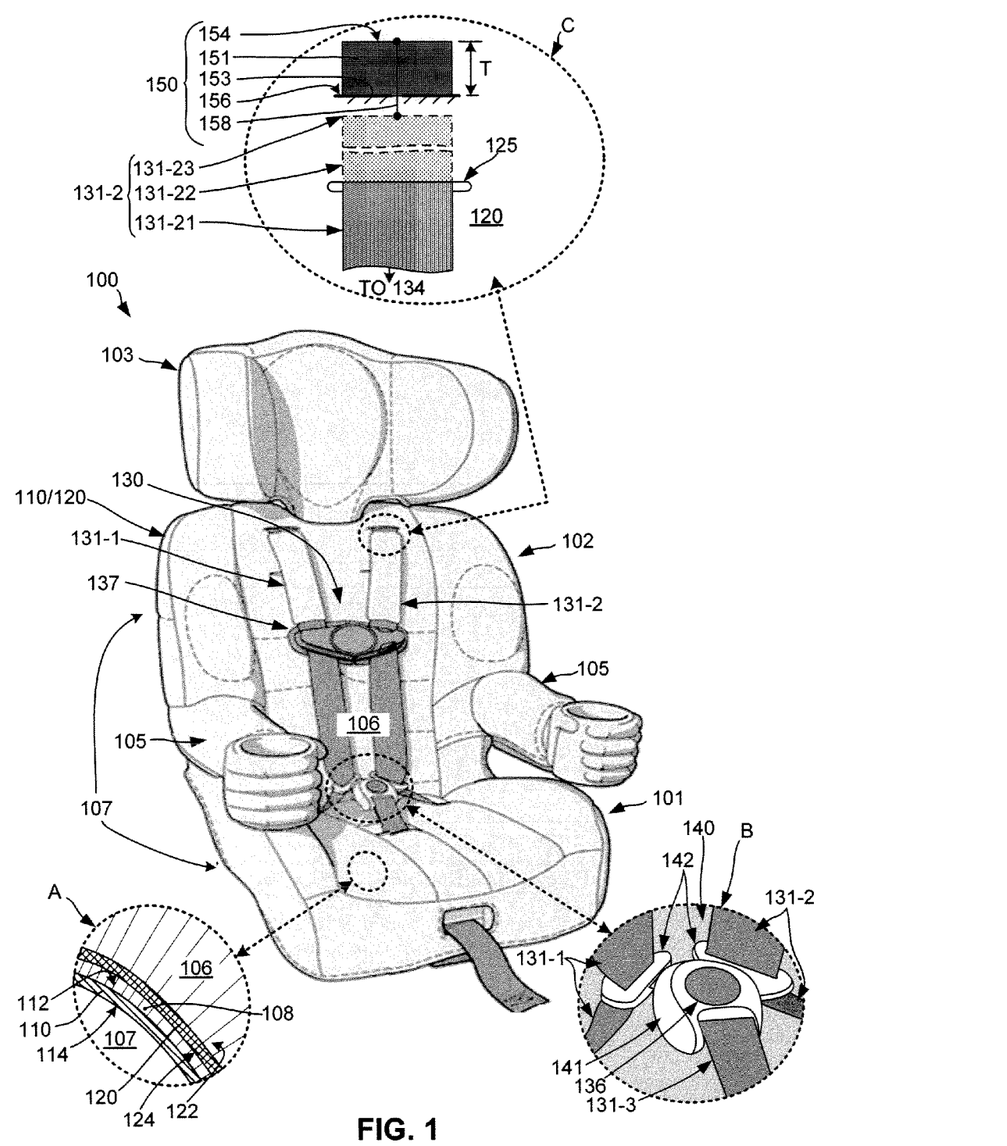
FIG. 1 is a top front perspective view showing an exemplary child safety seat including a generalized belt-end-mounted resilient shock absorber according to an embodiment of the present invention.

FIG. 1 is a perspective view showing a child safety seat 100 including a resilient shock absorber 150 (depicted in the bubble at the top of FIG. 1) according to an exemplary embodiment of the present invention. Child safety seat 100 is representative of seats currently sold by the assignee of the present invention, and is presented merely as an example of the type of child safety seat to which the present invention is applicable. That is, the aesthetic features of seat 100 are not intended to be limiting to the appended claims unless otherwise specified, and the present invention can be implemented on any child safety seat including the features recited in the appended claims.

The present invention is implemented using various resilient shock absorber types and attachment methods, some of which are described below with reference to certain simplified embodiments shown in FIGS. 3 to 9. Each of the embodiments described in these figures is understood to be a portion of a child safety seat similar to child safety seat 100. That is, the structures described in FIGS. 3 to 9 are assumed to be either part of a structure similar to that shown in FIG. 1 (in which case the same or similar reference numbers are used), or added to the structure shown in FIG. 1 (in which case new reference numbers are used).

Referring to FIG. 1, like most child safety seats, child safety seat 100 includes a substantially horizontal lower (seat) portion 101, a substantially vertical back portion 102 extending upward from lower portion 101, a headrest portion 103 disposed at an upper end of back portion 102, and two arm rest portions extending from opposite side edges of back portion 102 over side edges of lower portion 101. A seating area 106, which is the portion of seat 100 that carries a child and is visible during normal use, is generally defined as the region above lower portion 101, in front of back portion 102 and headrest portion 103, and between arm rest portions 105. A backside region 107 of seat 100, which is generally not visible during normal use, is generally defined as the region below lower portion 101, behind back portion 102 and headrest portion 103, and outside of arm rest portions 105.

Referring to bubble "A" located at the lower left portion of FIG. 1, child safety seat 100 is formed by a rigid seat shell 110 having a frontside surface 112 and an opposing backside surface 114, and includes an optional flexible (e.g., cloth or other fabric) seat cover 120 disposed over at least a portion of frontside surface 112 facing seating area 106. That is, frontside surface 112 of seat shell 110 faces seating area 106 (but is obscured by seat cover 120), and backside surface 114 faces backside region 107. Similarly, frontside surface 122 of seat cover 120 faces seating area 106, and backside surface 124 faces toward backside region 107. A mezzanine region 108 is defined by the zone between frontside surface 112 of seat shell 110 and backside surface 124 of seat cover 120—this region is understood to be "hidden" by seat cover 120 during normal use.

Referring to the center of FIG. 1, seat 100 includes a five-point safety harness assembly 130 including two side safety belts 131-1 and 131-2, a lower safety belt 131-3, and an associated buckle mechanism that are at least partially disposed in seating area 106 for securing a child to safety seat 100 during normal use. As indicated in bubble "B" located in the lower right portion of FIG. 1, side safety belts 131-1 and 131-2 include tongue portions 142 that are securely engaged inside latch portion 141, which is attached to a free end of lower central safety belt 131-1. A chest piece 137 is attached between upper portions of side safety belts 131-1 and 131-2. Each of safety belts 131-1, 131-2 and 131-3 includes a "hidden" (second) portion including a fixed end (described below) that are not visible in seating area 106 during normal operation (i.e., are either disposed in mezzanine region 108 or in backside region 107). The portions of harness assembly 130 that are visible in FIG. 1 are implemented using known mechanisms and techniques, and are notable only in that the present invention facilitates the use of standard safety straps, although additional modest padding may be added for comfort. As set forth below, the main thrust of the present invention is directed to the "hidden" portions of safety belts 131-1, 131-2 and 131-3, and more specifically to the manner in which the fixed ends of these belts are secured to seat shell 110.

Referring to bubble "C" at the top of FIG. 1, seat 100 is characterized by a resilient shock absorber 150 that is attached to the upper end of safety belt 131-2 and serves to dampen tensile forces applied on safety belt 131-2 in the manner described below. Resilient shock absorber 150 is preferably mounted in the "hidden" areas of seat 100 (i.e., either in mezzanine region 108 or in backside region 107), as depicted by its attachment to a hidden (second) portion 131-22 of safety belt 131-2. Note that an exposed (first) portion 131-21 of safety belt 131-2 is indicated below slot 125, and hidden portion 131-22 extends upward through slot 125 (i.e., under the fabric forming seat cover 120) to an end portion 131-23. In the present embodiment, resilient shock absorber 150 is depicted above end portion 131-23, and connected to end portion 131-23 by way of a simplified linkage 158. These representations are intended merely to simplify the following description, and are not intended to indicate a practical orientation or connection mechanism.

As indicated in bubble "C", resilient shock absorber 150 includes a soft-material resilient member 151 that is mounted against a rigid support (surface) 156, which as described below can be a portion of backside surface 114 of seat shell 110, or the surface portion of a flange or housing structure rigidly connected to seat shell 110. Soft-material resilient member 151 comprises a pliable three-dimensional object having a lower end surface (first end portion) 153 and an upper surface (second end portion) 154, where lower surface 153 is maintained in contact with rigid support 156, and upper surface 154 coupled to fixed end portion 131-23 of safety belt 131-2 (i.e., either directly or by way of optional linkage 158). Note that linkage 158 passes through or by rigid support 156 and through or by resilient member 151 so that downward movement of safety belt 131-2 produces a downward force on upper surface 154 of resilient member 151 (i.e., toward lower surface 153). Note also that resilient member 151 has a thickness T measured between upper surface 153 and lower surface 154.

According to an aspect of the invention, soft-material resilient member 151 is operably connected to safety belt 131-2 such that tensile forces conveyed along safety belt 131-2 cause compressive deformation of resilient member 151 against rigid support (surface) 156, and that the total displacement (play) of safety belt 131-2 is determined by the amount of compressive deformation experienced by resilient member 151. That is, a sudden tensile force applied to first portion 131-21 of safety belt 131-2 (e.g., using the depiction in bubble "C" for reference, a downward force transmitted along safety belt 131-2 caused, for example, by a child's weight during a collision) causes compressive deformation of resilient member 151 against rigid surface 156, whereby the tensile force is at least partially converted to potential energy stored in resilient member 151. The amount of compressive deformation (i.e., the difference between an initial state and the collapsed/deformed state of resilient member 151) is determined by the amount of force absorbed during the crash. The amount of force absorbed during the crash therefore determines the amount of displacement (play) of safety belt 131-2, but is limited to the thickness T of resilient member 151.

The beneficial aspects of this compressive deformation are described below with reference to FIGS. 2(A) to 2(D), which show relevant portion of safety seat 100 during different time periods associated with a crash event. In these figures, resilient member 151 is depicted by a peripheral surface 152 surrounding (defining) a volume of soft, resilient material 159 (e.g., initial volume $V_0$ in FIG. 2(A)), and by a dashed-line spring indicating the resilient characteristics of resilient material 159. For convenience, the actuation of resilient member 151 is indicated using optional linkage 158, which is connected between fixed end 131-23 of safety belt 131-2 and upper surface (second portion) 153 of resilient member 151.

In the following discussion, note that rigid support (surface) 156 remains stationary, while safety belt 131-2 translates (moves) vertically, and resilient member 151 either collapses or reforms (described below with reference to FIGS. 2(A) to 2(D)).

Figure 2A:
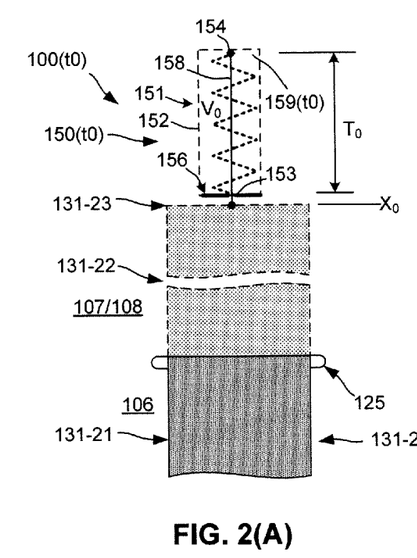
FIGS. 2(A), 2(B), 2(C) and 2(D) are simplified diagrams depiction operation of the shock absorber utilized in the child safety seat of FIG. 1 during operation.

FIG. 2(A) shows a portion of child seat 100 at an initial time t0 (i.e., seat 100(t0) occurring before the crash event. Resilient shock absorber 150(t0) includes resilient member 151 in an inactive state, where resilient material 159(t0) is in a neutral (un-deformed) state that is characterized by an initial (maximum) thickness $T_0$ measured between upper surface 154 and lower surface 153, and an initial (maximum) volume $V_0$ surrounded by peripheral surface 152. At time t0 a maximum amount of safety belt 131-2 is "hidden" under the seat cover (i.e., the amount of belt portion 131-22 disposed above slot 125 either in backside region 107 or in mezzanine region 108 is maximized, and the amount of "visible" belt portion 131-21 in seating area 106 is minimized), and end portion 131-23 is located at an uppermost X-direction position $X_0$.

Figure 2B:
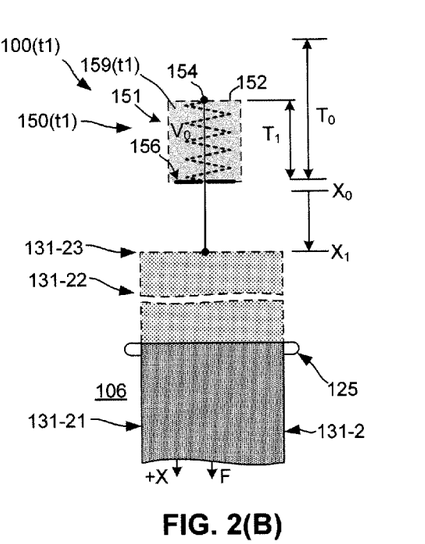

FIG. 2(B) shows a portion of child seat 100(t1) at point immediately after a crash event, and indicates the initial operation of resilient shock absorber 150(t1). As indicated at the lower end of FIG. 2(B), tensile force F is applied to safety belt 131-2 as the child is thrown forward, causing safety belt 131-2 to pull out of slot 125 (i.e., downward in FIG. 2(B)). This tensile force F is transmitted to belt end portion 131-23, which is moved downward by an amount $X_1$ from initial position $X_0$, and to upper surface 154 of resilient member 151 (by way of optional linkage 158), causing upper surface 154 to move downward by a corresponding amount toward rigid support 156. The downward movement of upper surface 154 results in the compressive deformation of the soft material forming resilient member 151, which can be described by at least two measurable changes. First, the thickness $T_1$ of resilient member 151 at time t1 is smaller than at time t0 (i.e., because the downward movement of lower surface 153 is prevented by rigid surface 156). Second, the compressive deformation of the resilient member 151 results in deforming peripheral surface 152 such that resilient member 151 temporarily assumes a second volume $V_1$ that is smaller than resting volume $V_0$. Note that an increased internal pressure of the soft material may also be measurable. These changes apply a gradual resistive force that dampens the initial shock, and also cause a conversion of at least some of the tensile force to potential energy stored in resilient member 151, which is indicated by the compression of the dashed-line spring in FIG. 2(B).

Figure 2C:
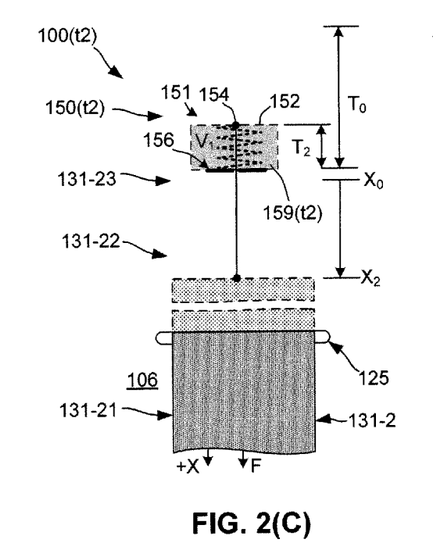

FIG. 2(C) shows a portion of child seat 100(t2) at the point after the crash event when the tensile force applied to shock absorber 150(t2) is maximized. As indicated at the lower end of FIG. 2(C), tensile force F has now caused safety belt 131-2 to pull out of slot 125 such that end portion 131-23 is displaced downward by a maximum amount $X_2$ from initial position $X_0$, which displacement causes upper surface 154 to move downward by a corresponding amount toward rigid support 156. The thickness $T_2$ of resilient member 151 at time t2 is now even smaller than at time t1, and the volume $V_2$ of soft material 159(t2) is even smaller than volume $V_1$. The maximum tensile force is at least partially converted to potential energy stored in resilient member 151, which is indicated by the compression of the dashed-line spring in FIG. 2(C).

According to an aspect of the present invention, by disposing soft-material resilient member 151 to collapse against rigid support 156 in the manner described above, the present invention prevents "hard stop" shocks that can significantly increase the G-forces transmitted to a child during a crash. That is, by disposing a suitable soft resilient material between upper surface 154 and rigid support 156, a sharp "hard stop" is prevented or minimized because a portion of the soft resilient material, no matter how much it is compressed, remains disposed between upper surface 154 and rigid support 156 at all points during the crash event. That is, there is no possible way for upper surface 154 to reach rigid support 156, and no other mechanism for limiting the downward movement of belt end portion 131-23, so there is no mechanism for imparting a "hard stop" on safety belt 131-2. Also, if the compressive-type shock absorbing function described above were performed using a hard resilient member (e.g., a coil spring), then the shock absorber would be subject to a "hard stop" when subjected to a force sufficient to entirely collapse the hard resilient member.

According to another aspect of the present invention, the total displacement of safety belt 131-2 is limited by the initial thickness of resilient member 151. That is, because a portion of resilient member 151 remains between upper surface 154 and rigid support 156 at all times, the total displacement of safety belt 131-2 in the X-direction must necessarily be less than initial length $X_0$ of resilient member 151. This feature provides a reliable maximum belt displacement amount that can be designed into a seat in order to prevent unintended escape or ejection of a child due to excessive safety belt displacement.

Figure 2D:
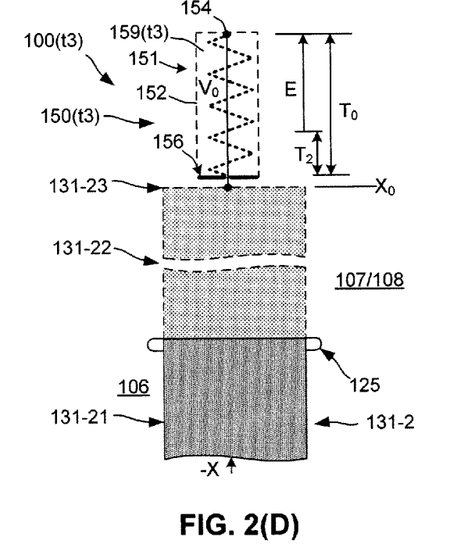

FIG. 2(D) shows a portion of child seat 100(t3) after the crash event when the tensile force is entirely terminated. As indicated at the upper end of FIG. 2(D), the absence of downward force on resilient member 151 and the concomitant release of potential energy causes soft material 159(t3) to reform (expand) to its original thickness $T_0$ and volume $V_0$, thereby causing upper surface 154 to move upward, which causes belt end portion 131-23 to also move upward. The resulting upward movement of belt end portion 131-23 pulls a corresponding length of safety belt 131-2 upward (i.e., in the −X direction) into slot 125 until end portion 131-23 returns to initial position $X_0$. The harness system is thereby returned to its initial adjusted state on the child.

Figure 3A:
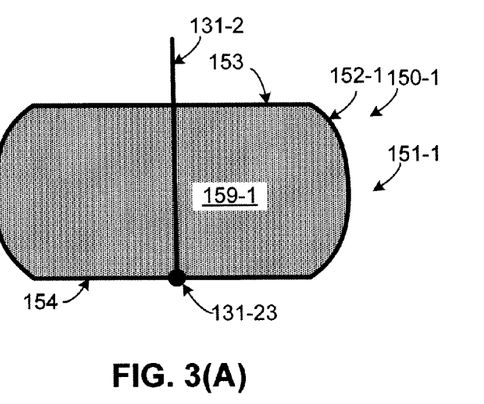
FIGS. 3(A) and 3(B) are simplified side views showing exemplary gel and bladder-type resilient members utilized in accordance with alternative specific embodiments of the present invention.
Figure 3B:
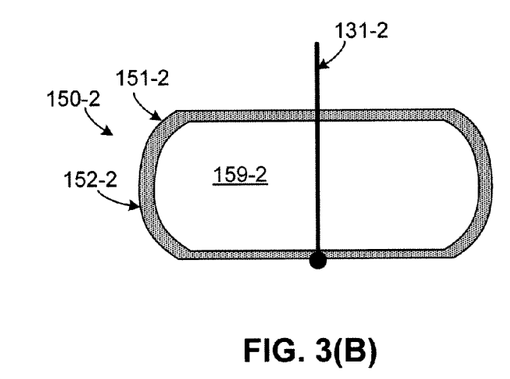

FIGS. 3(A) and 3(B) are simplified side views showing exemplary two-part soft-material resilient members according to alternative specific embodiments. FIG. 3(A) depicts an exemplary two-part shock absorber 150-1 including a resilient member 151-1 having a flexible outer membrane 152-1 (e.g., Kevlar™ or rubber) surrounding and containing a gel-like material 159-1, where safety belt 131-2 extends through end portion 153 and gel-like material 159-1, and end portion 131-23 of safety belt 131-2 is secured to end portion 154. FIG. 3(B) depicts a second two-part shock absorber 150-2 including a resilient member 151-2 formed by a flexible outer bladder surface 152-2 containing a fluid (i.e., gas or liquid) 159-2.

Figure 4:
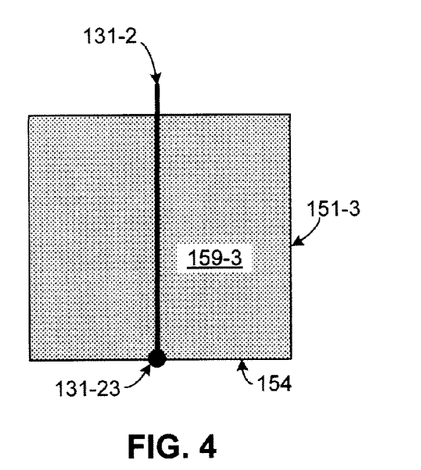
FIG. 4 is a simplified cross-sectional diagram depicting a block-type resilient member according to another embodiment of the present invention.

FIG. 4 depicts a shock absorber 150-3 including a single-piece soft-material resilient member 151-3 formed in accordance with another embodiment of the present invention. Single-piece resilient member 151-3 is characterized by a single soft material 159-3 shaped in the form of a block (i.e., square, rectangular or other three-dimensional geometric shape). Soft material 159-3 is uniformly disposed throughout the entire volume defined by outer surface 152-3, which is typically formed by exposed outer portions of soft material 159-3, but may include a thin protective layer, for example, to retain moisture. Although two-part resilient members 151-1 and 151-2 (described above with reference to FIGS. 3(A) and 3(B)) are feasible and may work in some applications, the inventors presently prefer single-piece soft-material resilient members entirely comprising a single soft-material (e.g., foam rubber, rubber, or any material that displaces when subjected to compressive force, but does not stay compressed and preferably recovers its pre-compression shape—this characteristic will help maintain the original harness spacing and still provide shock absorption). Such block-like soft-material resilient members provide the benefit of being relatively easy to produce, and facilitate easier assembly (i.e., it is typically easier to connect end portion 131-23 of belt 131-2 to an end portion 154 a solid block than to the structures described above with reference to FIGS. 3(A) and 3(B)).

Figure 5A:
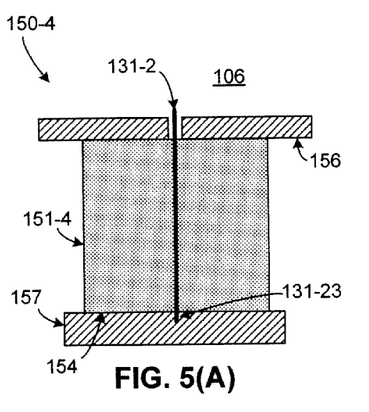
FIGS. 5(A) and 5(B) are simplified side-view diagrams showing a block-type resilient shock absorber mounted between two plates according to another specific embodiment of the present invention.
Figure 5B:
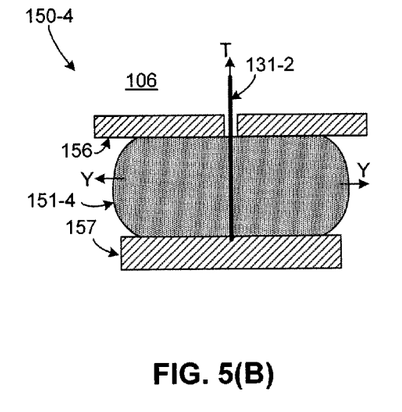

FIGS. 5(A) and 5(B) show a resilient shock absorber 150-4 according to another embodiment of the present invention. Shock absorber 150-4 utilizes a block-like resilient member 151-4 similar to that described in the embodiment immediately above, but shock absorber 150-4 is modified to include a rigid plate 157 that is attached to end portion 131-23 of safety belt 131-2. Rigid plate 157 is disposed against lower end portion 154 of resilient member 151-4, and as indicated in FIG. 5(B), serves to apply a substantially uniform pressure to resilient member 151-4 when safety belt 131-2 is subjected to tension T such that compressive deformation occurs over a wider area than if a point connection were made, and lateral deformation (i.e., in the Y-direction shown in FIG. 5(B)) of the soft material is substantially uniform.

Figure 6:
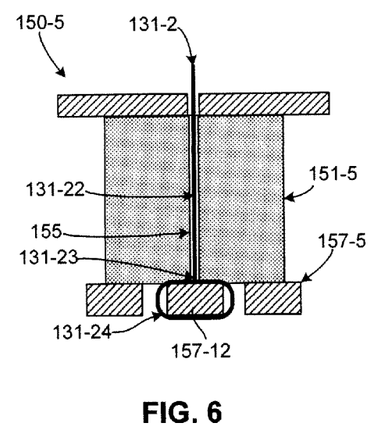
FIG. 6 is a simplified side-view diagrams showing a block-type resilient shock absorber mounted between a plate and a belt slide according to another specific embodiment of the present invention.
Figure 7:
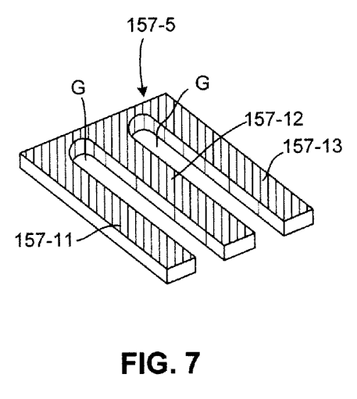
FIG. 7 is a perspective top view showing a belt slide utilized in the shock absorber of FIG. 6.

FIG. 6 is a simplified side-view diagram showing another resilient shock absorber 150-5 including a block-type resilient member 151-5 similar to that described above, but includes several new features. First, to facilitate assembly, resilient member 151-5 includes a central slit 155 through which portion 131-22 is inserted. Second, safety belt 131-2 is provided with a loop (web) 131-24 disposed at end portion 131-23, and a 3-bar belt slide (rigid plate) 157-5 is used in place of a simple rigid plate. Belt slide 157-5, which is also shown in FIG. 7, is a metal plate-like structure including a pair of grooves G disposed between a central bar 157-12 and two side bars 157-11 and 157-13. During assembly, end portion 131-23 of safety belt 131-2 is inserted through a central slit 155, and then a loop (web) 131-24 is trained over central bar 157-21 of 3-bar belt slide 157-5. The benefits of this approach are similar to those described above, with the use of 3-bar belt slide 157-5 providing an additional benefit of simplifying assembly.

Figure 8A:
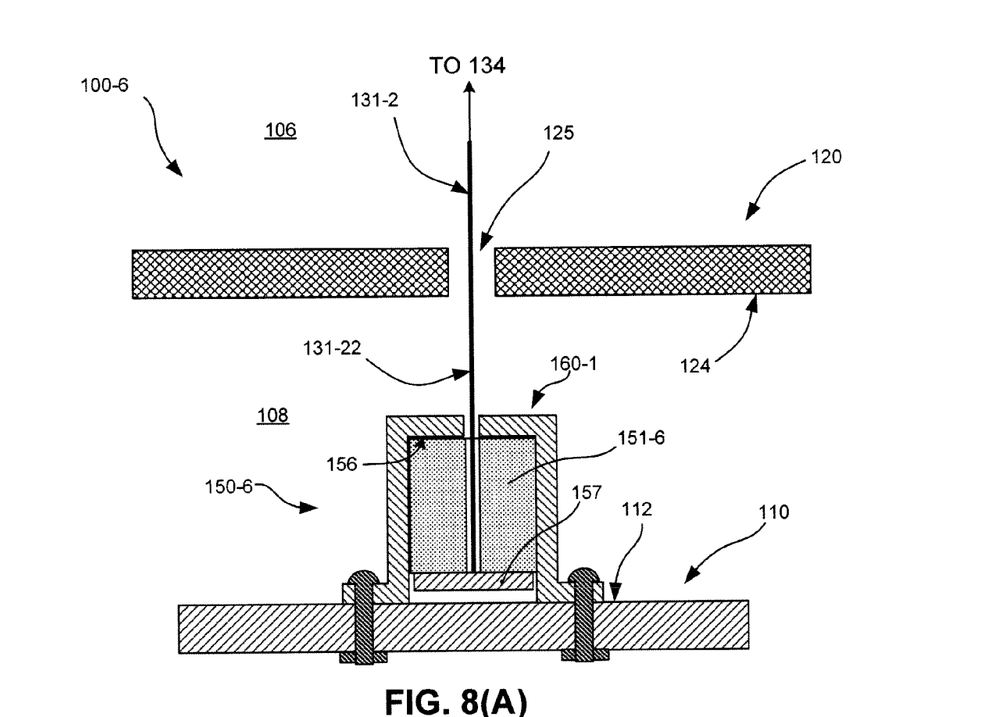
FIG. 8(A) is a simplified cross-sectional diagram depicting a frontside mounted resilient shock absorber according to another embodiment of the present invention.
Figure 8B:
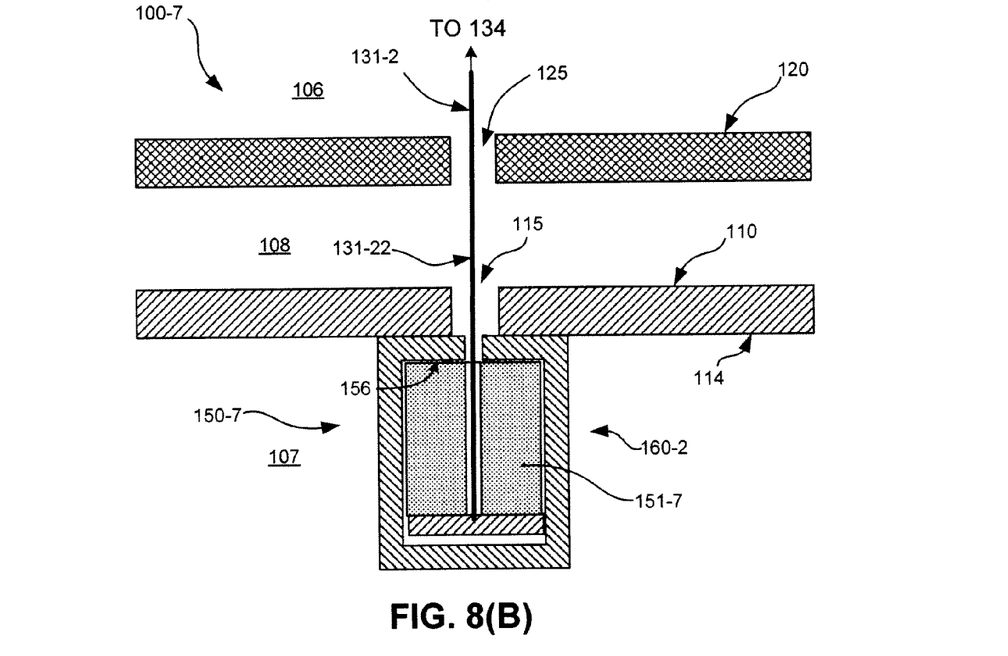
FIG. 8(B) is a simplified cross-sectional diagram depicting a backside mounted resilient shock absorber according to an embodiment of the present invention.

FIGS. 8(A) and 8(B) show resilient shock absorbers that include housings attached to seat shell 110 that provide containment areas for holding block-type resilient members. FIG. 8(A) shows a portion of a safety seat 100-6 in which resilient shock absorber 150-6 includes a housing 160-1 that holds block-like resilient member 151-6, wherein an upper portion of housing 160-1 forms rigid support (surface) 156. According to an aspect of this embodiment, housing 160-1 facilitates disposing a resilient shock absorber in mezzanine region 108 (e.g., secured to frontside surface 112 of seat shell 110 by fasteners and disposed under backside surface 124 of seat cover 120), with safety belt 131-2 extending from rigid plate 157, through resilient member 151-6, through slot 125 in seat cover 120 and into seating area 106. FIG. 8(B) shows a portion of a safety seat 100-7 in which resilient shock absorber 150-7 includes a second housing 160-2 that is disposed in backside region 107 (e.g., attached to backside surface 114) such that safety belt 131-2 extends through a slot 115 defined in seat shell 110 into mezzanine region 108, and then through slot 125 in seat cover 120 into frontside seating area 106. The benefits of mounting resilient member inside housings 160-1 and 160-2 are that these housings may be used to simplify assembly, and that the side walls of the housing may be used to further restrict lateral deformation of the resilient member (e.g., outward deformation of the soft material in the Y-direction, as indicated in FIG. 5(B)).

Figure 9:
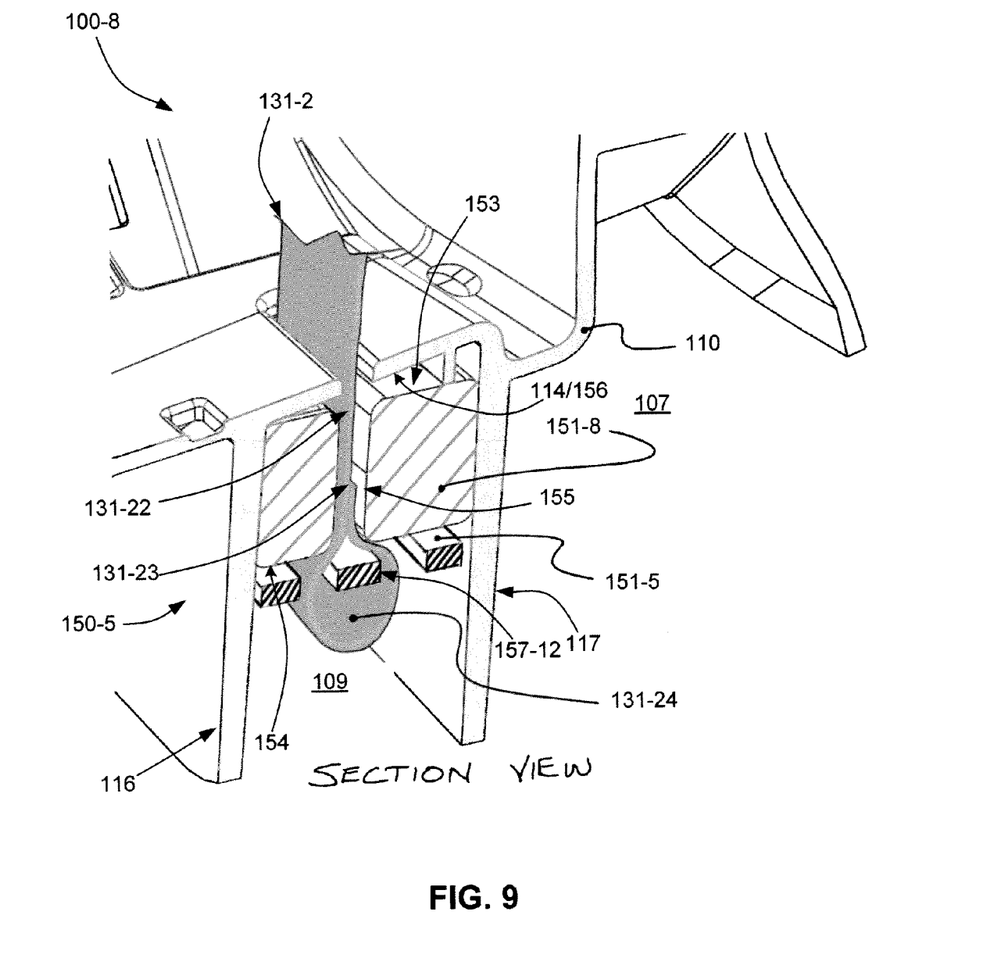
FIG. 9 is a partial backside perspective view showing a foam rubber block-type resilient shock absorber disposed in a flange-defined containment area with a belt slide according to another specific embodiment of the present invention.

FIG. 9 is a partial backside perspective view showing a portion of safety seat 100-8 according to a presently preferred embodiment in which resilient shock absorber 150-8 includes a foam rubber block 151-8 disposed in a flange-defined containment area 109 and actuated using the three-bar belt slide (rigid plate) 157-5 described above. Flanges 116 and 117 are integrally molded to and extend from a backside surface 114 of seat shell 110, which serves as rigid support (surface) 156 that restricts upper surface 153, and form (define) containment area 109 (which is part of backside region 107) that serves to movably secure foam rubber block 151-8 to seat shell 110. Flanges 116 and 117 and also serves to guide the movement of belt slide 157-5, which is also disposed in containment area 109. In a practical embodiment, foam rubber block 150-8 comprises expanded polypropylene with a density in the range of 20 to 60 grams per liter and includes a central slit 155 through which portion 131-22 of safety belt 131-2 extends. Safety belt 131-2 extends to the buckling mechanism (not shown) disposed in the seating portion of seat 100-8 in the manner indicated in FIG. 1. End portion 131-23 of safety belt 131-2 includes a loop (web) 131-24 that is disposed over a central bar 157-12 of three-bar belt slide 157-5. Belt slide 157-5 contacts substantially all of lower surface 154 of foam rubber block 150-84 such that belt slide 157-5 applies a substantially uniform pressure on foam rubber block 151-8 during a crash, whereby foam rubber block 151-8 is compressed to convert the resulting tensile force at least partially to potential energy stored in foam rubber block 151-8. This arrangement was found to provide superior and reliable shock absorbing functionality at a minimal cost, and was successfully used to pass government chest acceleration compliance standards. By forming fixed end portion 131-23 of safety belt 131-2 with loop (web) 131-24, the assembly of belt 131-2 to belt slide 157-5 is greatly simplified, thereby minimizing assembly costs.

Although the present invention has been described with respect to certain specific embodiments, it will be clear to those skilled in the art that the inventive features of the present invention are applicable to other embodiments as well, all of which are intended to fall within the scope of the present invention. For example, although the above description only specifies a shock absorber attached to one end of safety belt 131-2, the resilient shock absorbers described above can be utilized at one or more ends of the other safety belts as well. In addition, resilient shock absorbers having different damping strengths and/or belt-play lengths may be utilized on the same seat, for example, to coordinate peak deceleration forces in a way that minimizes chest deceleration (e.g., by allowing the child's head/chest region to decelerate before the child's waist region).

The invention claimed is:
1. A child safety seat comprising:
a seat shell having a frontside surface facing a seating area of said child safety seat, and a backside surface facing a backside region of said child safety seat;
a safety harness assembly including one or more safety belts, each of the one or more safety belts including a first portion disposed in the seating area and including one of a latch portion and a tongue portions, each of the one or more safety belts including a second portion and a fixed end portion disposed at an end of the second portion; and
a resilient shock absorber including a soft-material resilient member having opposing first and second end portions, the first end portion contacting a rigid surface, and a second end portion operably coupled to the fixed end portion of said at least one safety belt such that a sudden tensile force applied to the first portions of the one or more safety belts causes compressive deformation of the resilient member against the rigid surface from an initial state to a deformed state, whereby the tensile force is at least partially converted to potential energy stored in the resilient member, wherein the resilient member comprises a foam rubber block, and wherein the safety belt extends through a slit defined between said first and second end portions through the foam rubber block.

2. The child safety seat of claim 1, wherein the resilient member has a resting thickness measured between said opposing first and second end portions, and wherein movement of the first end portion of the resilient member is prevented by said the rigid surface such that a maximum possible displacement of said one or more safety belts in response to said sudden tensile force is less than said resting thickness.

3. The child safety seat of claim 1, wherein a peripheral surface of the resilient member defines a resting volume, and wherein said compressive deformation of the resilient member comprises deforming said peripheral surface such that the resilient member temporarily assumes a second volume that is smaller than said resting volume.

4. The child safety seat of claim 1, wherein the second portion of said at least one safety belt extends through the resilient member such that the fixed end portion of said at least one safety belt is disposed adjacent to the second end portion of the resilient member.

5. The child safety seat of claim 1, wherein the resilient shock absorber further comprises a rigid plate attached to the fixed end portion of said at least one safety belt and disposed to press against the second end portion during said compressive deformation of the resilient member.

6. The child safety seat of claim 5, wherein said at least one safety belt further comprises a loop portion disposed on said fixed end portion, and wherein the rigid plate comprises a belt slide including a central bar extending through the loop portion.

7. The child safety seat of claim 1, wherein the resilient shock absorber further comprises a housing attached to said seat shell, and where said resilient member is disposed inside of said housing.

8. The child safety seat of claim 1, wherein the resilient shock absorber is disposed between the frontside surface of said seat shell and a flexible seat cover disposed over the frontside surface of the seat shell.

9. The child safety seat of claim 1, wherein the resilient shock absorber is disposed in the backside region and said at least one safety belt extends from the resilient shock absorber through a slot defined in the seat shell.

10. The child safety seat of claim 1, wherein the seat shell includes one or more flanges defining a containment area, and wherein the resilient member is disposed in the containment area.

11. The child safety seat of claim 10, wherein the resilient shock absorber further comprises a rigid plate member attached to the fixed end portion of said at least one safety belt and disposed in the containment area against said the second end portion of the resilient member.

12. The child safety seat of claim 10,
wherein the resilient member defines a slit extending between said first and second end portions through the resilient member, and
wherein the second portion of said at least one safety belt extends through the slit.

13. A child safety seat comprising:
a rigid seat shell;
a soft-material resilient member;
a safety belt movably connected to the rigid seat shell, the safety belt including an end portion; and
a rigid plate disposed adjacent to the resilient member and coupled to the end portion of the safety belt;
wherein the resilient member is mounted on the rigid seat shell such that the resilient member is compressed when a tensile force transmitted from the first belt portion to the end portion pulls the rigid plate against the resilient member, whereby the tensile force is at least partially converted to potential energy stored in the resilient member,
wherein the resilient member comprises a foam rubber block defining a central slit, and
wherein the safety belt includes a first belt portion disposed in a seating area of said child safety seat, and a second belt portion extending from the first belt portion through the central slit of the resilient member to the end portion.

14. The child safety seat of claim 13, wherein the fixed end portion of the safety belt comprises a loop, and wherein the rigid plate member comprises a belt slide including a central bar extending through the loop.

15. The child safety seat of claim 13, wherein the rigid seat shell includes one or more flanges defining a containment area, and wherein the foam rubber block and the rigid plate are disposed in the containment area.

16. The child safety seat of claim 15, wherein the flanges and the containment area are disposed in a backside region of said seat shell.

17. The child safety seat of claim 16, wherein the flanges are integrally molded to a backside surface of said seat shell.

* * * * *